(12) United States Patent
Tang et al.

(10) Patent No.: US 12,181,327 B2
(45) Date of Patent: Dec. 31, 2024

(54) FLOWMETER CALIBRATION SYSTEM AND METHOD FOR CRYOGENIC PROPELLANT ROCKET ENGINE

(71) Applicant: Xi'an Aerospace Propulsion Test Technology Institute, Shaanxi (CN)

(72) Inventors: Binyun Tang, Shaanxi (CN); Yu Chen, Shaanxi (CN); Ming Han, Shaanxi (CN); Hongpeng Xu, Shaanxi (CN); Li Guo, Shaanxi (CN); Jibin Shen, Shaanxi (CN); Qiang Gao, Shaanxi (CN); Yan Gao, Shaanxi (CN)

(73) Assignee: Xi'an Aerospace Propulsion Test Technology Institute, Shaanxi (CN)

( * ) Notice: Subject to any disclaimer, the term of this patent is extended or adjusted under 35 U.S.C. 154(b) by 256 days.

(21) Appl. No.: 18/002,405

(22) PCT Filed: Aug. 27, 2021

(86) PCT No.: PCT/CN2021/114962
§ 371 (c)(1),
(2) Date: Dec. 19, 2022

(87) PCT Pub. No.: WO2023/010629
PCT Pub. Date: Feb. 9, 2023

(65) Prior Publication Data
US 2023/0341254 A1    Oct. 26, 2023

(30) Foreign Application Priority Data

Aug. 4, 2021  (CN) .......................... 202110892142.3

(51) Int. Cl.
*G01F 25/10*  (2022.01)
*F17C 13/00*  (2006.01)

(52) U.S. Cl.
CPC ............ *G01F 25/14* (2022.01); *F17C 13/001* (2013.01)

(58) Field of Classification Search
CPC ...................................................... G01F 25/10
See application file for complete search history.

(56) References Cited

U.S. PATENT DOCUMENTS

| 2017/0089753 A1* | 3/2017 | Otaki ................... G01F 25/14 |
| 2018/0188101 A1* | 7/2018 | Weindl .................. G01F 25/14 |
| 2022/0049987 A1* | 2/2022 | Leelayoova ........... G01F 25/14 |

FOREIGN PATENT DOCUMENTS

| CN | 202974416 U | 6/2013 | |
| CN | 106124006 A * | 11/2016 | ......... G01F 25/0046 |

(Continued)

*Primary Examiner* — Herbert K Roberts
(74) *Attorney, Agent, or Firm* — NKL Law; Allen Xue

(57) ABSTRACT

A cryogenic propellant rocket engine, a flowmeter calibration system and method for the cryogenic propellant rocket engine have been provided. The flowmeter calibration system for the cryogenic propellant rocket engine includes a container filling unit, a container, a supply pipeline, a weighing unit, a quick recovery container, a weighing and filling recovery unit and a recovery unit which are sequentially connected; the container filling unit is configured to connect a tank wagon with the container; and the supply pipeline includes a temperature sensor and a pressure sensor, as well as a first isolation valve, a reference flowmeter, a calibration flow adjusting manual valve, a vertical main pipe and N circumferentially and uniformly distributed horizontal pipes which are sequentially connected by a pipeline.

10 Claims, 2 Drawing Sheets

(56) References Cited

FOREIGN PATENT DOCUMENTS

| | | | | | |
|---|---|---|---|---|---|
| CN | 107014468 | A | * | 8/2017 | ......... G01F 25/0046 |
| CN | 107131931 | A | | 9/2017 | |
| CN | 107941307 | A | | 4/2018 | |
| CN | 109253780 | A | * | 1/2019 | |
| CN | 110231173 | A | | 9/2019 | |
| CN | 110857876 | A | * | 3/2020 | .............. F17C 13/00 |
| CN | 111397699 | A | | 7/2020 | |
| CN | 112903068 | A | * | 6/2021 | ......... G01F 25/0046 |
| CN | 113029303 | A | * | 6/2021 | |
| CN | 113252144 | A | * | 8/2021 | |
| JP | 2001215145 | A | | 8/2001 | |
| RU | 2680986 | C1 | * | 3/2019 | ........... G01F 25/003 |

\* cited by examiner

FLOWMETER CALIBRATION SYSTEM AND METHOD FOR CRYOGENIC PROPELLANT ROCKET ENGINE

FIELD

The present disclosure relates to a cryogenic propellant rocket engine, in particular to a flowmeter calibration system and method for the cryogenic propellant rocket engine.

BACKGROUND

For rocket engines using cryogenic propellants such as liquid oxygen, liquid hydrogen, methane, etc., accurate flow measurement is required during a gas-liquid-mix-state of engine precooled emissions in a ground hot run test. Generally, turbine type flowmeters are used for flow measurement. A turbine type flowmeter needs to be calibrated before use, because the flow calibration of the turbine flowmeter is generally conducted in a calibration center, and can only be conducted under the flow of a water medium, so it is necessary to be calibrated under the flow of the cryogenic medium before the turbine flowmeter is applied to the flow measurement of a cryogenic medium.

A conventional flow calibration method is generally to conduct the flow calibration of the turbine flowmeter at a work site. Generally, the amount of liquid flowing out of a container is used as the basis for flowmeter calibration. First, the flowmeter is installed at a liquid outlet of the container, and then the flow calibration of the flowmeter is conducted through the flow output of the container. In order to ensure accuracy, it is necessary to accurately measure the volume of the calibration container first. At present, a water calibration method or a laser measuring instrument is usually used. The water calibration method is to fill the container with water, place the water in a weighing container, and obtain a height difference of a corresponding container by weighing. Through multiple calibrations, the actual volume of each height in the container can be measured. The laser measuring instrument is to measure the actual volume of the container through a laser measuring instrument, and subtract the volume of reinforcement and other superfluous objects corresponding to each section in the container to obtain the actual and accurate volume of the container.

Then the calibration container is filled with water, and a level gauge that can accurately measure a liquid level of the cryogenic medium is inserted to measure the liquid level. By aligning an initial zero liquid level value of the level gauge with a calibrated zero position of the container, the actual liquid flow of the calibrated container can be obtained more accurately within cumulative time. When the container calibrates the flow of the flowmeter through the cryogenic medium, a cryogenic medium flow supply pipeline is established, and the container and flowmeter are installed on the supply pipeline. By comparing the medium mass in the container flowing out in a period of time with the actual number of turns of a flowmeter impeller in that period of time, the medium volume flow of each turn of the flowmeter impeller can be obtained to realize the flow calibration of the flowmeter.

However, the existing technical solution has the following problems in use:
1. When measuring the volume of the container, if the cryogenic medium is directly used instead of water, the volume of the container differs greatly from that during the actual work due to the low temperature shrinkage and evaporation of the cryogenic medium and the uneven deformation of the relevant structures. It is very difficult to weigh the container, which then leads to a large error in the flow calibration value of the flowmeter.
2. When the flow of the flowmeter is calibrated by the flow of the container, in order to ensure the working accuracy of a cryogenic medium level gauge, a segmented capacitance level gauge and other similar level gauges are generally used. Generally, the level gauge cannot take into account both water and the actual cryogenic medium at the same time. When the level gauge measures water, it is difficult to remove water from its interior. Therefore, it is generally necessary to remove the level gauge for calibration and use laser and other methods to measure the liquid level. After the level calibration is completed, the container is cleaned, and the level gauge is reinstalled. When measuring again, the zero alignment of the same level gauge has a relatively large error, or the use of different level gauges also has a large error.
3. During calibrating the reference flowmeter, the conventional calibration method is to ensure that an outlet does not hold pressure. Generally, the calibration method of open-type discharge of the cryogenic medium is used. For liquid hydrogen, methane and other explosive mediums, which are dangerous and have poor safety, the reference flowmeter can only be calibrated for a short time period, thereby reducing the accuracy of an average flow calculation method of the reference flowmeter.

SUMMARY

The present disclosure aims to solve the problem that when an existing cryogenic propellant rocket engine uses a flowmeter for flow measurement, if a cryogenic medium is directly used instead of water, the volume of a container differs greatly from that during the actual work, it is very difficult to weigh the container, a level gauge needs to be installed for calibration and measurement, operation is cumbersome, and the error is large, thus reducing the accuracy of the flowmeter measurement; and when calibrating a reference flowmeter, the reference flowmeter can only be calibrated for a short time period through a calibration method of open discharge of the cryogenic medium, and the calculation accuracy of the average flow of the reference flowmeter is reduced, and provides a flowmeter calibration system and method for a cryogenic propellant rocket engine.

The technical solution adopted by the present disclosure is:

The present disclosure provides a flowmeter calibration system for the cryogenic propellant rocket engine, characterized in that:
the flowmeter calibration system includes a container filling unit, a container, a supply pipeline, a weighing unit, a quick recovery container, a recovery unit and a weighing and filling recovery unit which are sequentially connected;
the container filling unit is configured to connect a tank wagon with the container;
the supply pipeline includes at least one temperature sensor and at least one pressure sensor which are disposed at any position, as well as a first isolation valve, a reference flowmeter, a calibration flow adjusting manual valve, a vertical main pipe and several circumferentially and uniformly distributed horizontal pipes which are sequentially connected by a pipeline, wherein 2≤N≤6; an inlet of the first isolation valve is connected with an outlet of the container, and an outlet of the vertical main pipe is connected with inlets of several horizontal pipes respectively;

the weighing unit includes several vertical branch pipes, several collection containers and weighing devices; vertical branch pipes communicate with corresponding horizontal pipes respectively through a force balance compensator; vertical branch pipes are disposed right above the corresponding collection containers respectively; the weighing devices are disposed below the several collection containers correspondingly, and the weighing devices are configured to weight incremental liquids in the collection containers;

outlets of the collection containers communicate with an inlet of the quick recovery container through an isolation pipeline and a second isolation valve;

the weighing and filling recovery unit is configured to connect the tank wagon with the collection containers;

the recovery unit is configured to connect the quick recovery container with the tank wagon;

the weighing devices include weighing assemblies and at least two balance assemblies uniformly distributed on the weighing assemblies;

each weighing assembly includes a base, at least two load cells, a movable platform and a support frame which are sequentially disposed from bottom to top; the at least two load cells are uniformly laid below a lower table surface of the movable platform, sensitive surfaces of the load cells are in gap or contact arrangement with the lower table surface of the movable platform, and the support frame is installed in a middle part of the movable platform and configured to support the corresponding collection containers;

each balance assembly includes a support rod disposed on the base, a lever hinged on the support rod, a hanging chain and a weight;

an inner side end of the lever is connected with the movable platform through the hanging chain, and the weight is hung on an outer side end thereof.

Further, two balance assemblies are symmetrically disposed on two sides of the movable platform.

Further, four collection containers are disposed, and the corresponding four horizontal pipes are distributed in a cross pattern.

Further, the flowmeter calibration system further includes a cryogenic medium exhaust system, the cryogenic medium exhaust system includes at least two exhaust pipelines, inlets of the exhaust pipelines communicate with at least one collection container respectively, and outlets thereof are connected with an external gas purification system respectively; one of the exhaust pipelines is provided with an automatic exhaust valve, the automatic exhaust valve is controlled by an external control unit to exhaust gas in the collection containers, and other exhaust pipelines are provided with manual exhaust valves;

the calibration flow adjusting manual valve is connected in parallel with a calibration pneumatic valve, and the calibration pneumatic valve is controlled by the external control unit to discharge a cryogenic medium in the supply pipeline to the weighing and filling recovery unit.

Further, the container filling unit includes a filling pipeline and a recovery pipeline connected to the filling pipeline in parallel, the filling pipeline is sequentially provided with a filling manual valve and a filling filter in a filling direction of the cryogenic medium, the recovery pipeline is sequentially provided with a recovery valve, a corrugated pipe compensator and a filling interface in a recovery direction of the cryogenic medium, and the filling interface is connected with the tank wagon through a flexible pipe;

the weighing and filling recovery unit has a same structure as the container filling unit, the weighing and filling recovery unit is configured to fill the collection containers with the cryogenic medium and recover the cryogenic medium therefrom, and the recovery unit has a same structure with the recovery pipeline and is configured to recover the cryogenic medium into the tank wagon.

Further, the force balance compensator adopts an angle-type force balance compensator, and the load cells are installed on a pull rod of the angle-type force balance compensator.

Further, the supply pipeline is further provided with a container bottom corrugated compensator 3, a container horizontal-section corrugated compensator, a filter and a middle corrugated compensator in a transportation direction of the cryogenic medium; and the collection containers are fully enclosed vacuum sandwich containers.

The present disclosure further provides a flowmeter calibration method for the cryogenic propellant rocket engine, characterized in including the following steps:

step 1: in-situ calibration of a weighing unit step 1.1: filling, by a weighing and filling recovery unit, collection containers with cryogenic mediums, and recovering, when a filling liquid level in each collection container reaches 70% or above and temperatures of the cryogenic mediums in the collection containers are <5° C., the cryogenic mediums in the collection containers to a quick recovery container;

step 1.2: recording a zero position of a load cell and a total mass $m_{total}$ of weights on a weighing device;

step 1.3: unloading, according to a usable range of the load cell, weights with a preset mass $m_0$ on each lever, recording an output value V of the load cell and the mass m of the remaining weights, on this basis, unloading the weights with the preset mass $m_0$ again, recording the output value V of the load cell 32 and the mass m of the remaining weights, and in this way, unloading the weights with the mass $m_0$ for M times, and recording M groups of data totally, where M≥5, $m_0$=F/Mg, F is a maximum range of the load cell, and g is an acceleration of gravity;

step 1.4: repeating step 1.3 for K times, where K≥2, and performing least squares fit on recorded ((K+1)×M) groups of data to obtain a corresponding relationship between V and ($m_{total}$−m), so as to complete the in-situ calibration of the weighing unit;

step 2: precooling of a cryogenic medium in-situ calibration system precooling the collection containers and a first pipeline in front of a container and a supply pipeline manual valve sequentially and cooling a second pipeline and vertical branch pipes behind the supply pipeline manual valve by the cryogenic mediums; requiring that a difference between a temperature of a previous precooling area and temperatures of the cryogenic mediums under a standard atmospheric pressure is less than 5° C. before the precooling of a next precooling area;

closing a calibration flow adjusting manual valve after cooling of the vertical branch pipes is completed, and draining a pipeline system at a downstream of the calibration flow adjusting manual valve, so as to realize the precooling of the cryogenic medium in-situ calibration system;

step 3: in-situ calibration of a container step 3.1: closing a second isolation valve, opening a first isolation valve, and filling the container by a container filling unit;

step 3.2: gradually opening the calibration flow adjusting manual valve according to a liquid level drop height required to be calibrated for the container, slowly discharging the cryogenic mediums in the container to the collection containers, weighing each collection container by using the weighing device, calculating a volume corresponding to each liquid level drop height in the container, and repeating for at least one time to complete calibration of the container; and after weighing is completed each time, opening the second isolation valve to discharge the weighed cryogenic mediums from the collection containers;

step 4: calibration of a reference flowmeter step 4.1: closing the second isolation valve, or removing an isolation pipeline and a downstream pipeline thereof, so as to discharge the cryogenic mediums in the collection containers only from the weighing and filling recovery unit;

closing the first isolation valve and the calibration flow adjusting manual valve, and filling the container by the container filling unit;

step 4.2: opening the first isolation valve and a calibration pneumatic valve, discharging the cryogenic mediums from the weighing and filling recovery unit after passing through the supply pipeline and the collection containers, recording the volume of the cryogenic mediums decreasing in the container in the same time period many times, calculating an average flow rate of the supply pipeline in this time period, and calibrating a flow rate of the reference flowmeter by the average flow rate.

Further, between step 4.1 and step 4.2, the flowmeter calibration method further includes step 4.11: connecting a cryogenic medium exhaust system to the collection containers, opening an automatic exhaust valve through an external control unit, and exhausting gas generated by volatilization of the cryogenic mediums in the system; and closing the automatic exhaust valve when the pressure in the system is 0.1 MPa.

Further, the precooling of the cryogenic medium in-situ calibration system in step 2 is specifically as follows:

step 2.1: by the weighing and filling recovery unit, filling the collection containers with the cryogenic mediums, and meanwhile, filling, by the container filling unit, the container the cryogenic mediums, wherein when the filling liquid levels in the collection containers reach 40% or above, and the filling liquid level of the container 1 reaches 70% or above, the precooling of the collection containers 11 and the container 1 is realized;

step 2.2: opening the first isolation valve, when the temperatures of the cryogenic mediums in the collection containers and the container are <5° C., closing the calibration flow adjusting manual valve, cooling the first pipeline in front of the supply pipeline manual valve by the cryogenic mediums, and meanwhile opening the second isolation valve to discharge the cryogenic mediums in the collection containers;

step 2.3: opening, when a difference between a measured temperature of a temperature sensor in the first pipeline and the temperatures of the cryogenic mediums under the standard atmospheric pressure is less than 5° C., the calibration flow adjusting manual valve, and cooling the second pipeline and the vertical branch pipes behind the supply pipeline manual valve;

step 2.4: when a difference between a measured temperature of a temperature sensor in the second pipeline and the temperatures of the cryogenic mediums under the standard atmospheric pressure is less than 5° C. and the pressure of the cryogenic mediums in the supply pipeline is ≤0.05 Mpa, closing the calibration flow adjusting manual valve, and opening the second isolation valve, so as to realize the precooling of the cryogenic medium in-situ calibration system after draining the cryogenic mediums from the collection containers, the isolation pipeline and the quick recovery container.

Compared with the prior art, the present disclosure has the following beneficial effects.

1. The flowmeter calibration system for the cryogenic propellant rocket engine adopted in the present disclosure adopts a force balance mode of a multi-container symmetrical structure, a plurality of collection containers adopt a fully symmetrical structure, the force balance compensator is disposed at a turning point of the pipeline, which can convert the pipeline force at the turning point into the internal force in the pull rod of the force balance compensator, the load cell is installed on the pull rod of the force balance compensator, which can measure the symmetry of each force balance compensator by comparison, and can be used as the in-situ correction when the force of each horizontal pipe is asymmetric. At the same time, a plurality of force balanced corrugated pipes (corrugated compensators) are disposed on the supply pipeline, which can effectively reduce the impact of the axial force generated by the pipeline on the weighing of the collection containers due to the increase of the internal pressure of the supply pipeline.

2. According to the flowmeter calibration system for the cryogenic propellant rocket engine adopted by the present disclosure, each collection container solves the problem of the lateral force generated in a horizontal direction of the collection containers through the symmetrical structure formed by the force balance compensator, especially the symmetrical structure of the four collection containers, which can effectively eliminate the influence caused by the internal pressure of the horizontal pipes, thereby effectively eliminating the additional stress caused by the small amount of cryogenic medium gasification in each container.

3. The flowmeter calibration system for the cryogenic propellant rocket engine adopted in the present disclosure adopts a suspension bearing structure, and a high-precision weighing unit is disposed under each container. The weighing device can first balance the weight of the container, and then can replace the load cell with a load cell with a small range to realize high-precision weighing of the cryogenic mediums entering the container, eliminate the basic zero position, and improve the weighing accuracy. At the same time, each container is fully enclosed, and vacuum sandwich is used for thermal insulation to avoid the phenomenon of cryogenic medium volatilization due to temperature rise.

4. The flowmeter calibration system for the cryogenic propellant rocket engine adopted in the present disclosure can exhaust the gas generated by the volatilization of the cryogenic mediums in the system before calibrating the reference flowmeter by using a cryogenic medium exhaust system, so as to avoid pressure holding at the outlet of the system. Therefore, the reference flowmeter can be safely calibrated for a long time, the total amount of calculation data of the reference flowmeter is increased, and the accuracy of the average flow calculation method of the reference flowmeter can be improved.

5. The flowmeter calibration method for the cryogenic propellant rocket engine adopted in the present disclosure avoids the influence of temperature difference on the quality change of the cryogenic mediums, and further improves the accuracy of the in-situ calibration of the container by using the cryogenic mediums to precool the cryogenic medium in-situ calibration system in advance, and conducting the in-situ calibration on the container through the weighing device. It is unnecessary to install the level gauge in the stage of the in-situ calibration of the container and calibration of the reference flowmeter, which avoids the limitation of the level gauge in use.

6. The flowmeter calibration method for the cryogenic propellant rocket engine adopted in the present disclosure can eliminate the effect of additional force caused by precooling shrinkage of containers and pipelines by conducting the in-situ calibration on a weighing sensor, so that a measured value of the weighing sensor can more truly represent the medium quality.

In the figure:
1—container; 101—exhaust valve;
2—container filling unit, 21—recovery valve, 22—corrugated pipe compensator, 23—filling interface, 24—filling filter, and 25—filling manual valve;
3—container bottom corrugated compensator, 4—first isolation valve, 5—container horizontal-section corrugated compensator, 6—filter, 7—reference flowmeter, 8—middle corrugated compensator, 9—calibration flow adjusting manual valve, 91—vertical main pipe, 92—horizontal pipe, 99—calibration pneumatic valve, and 100—vertical branch pipe;
10—force balance compensator, 11—collection container, 111—level gauge, 12—isolation pipeline, 13—second isolation valve, 14—quick recovery container, 15—weighing and filling recovery unit, 16—recovery unit, 17—automatic exhaust valve, and 18—manual exhaust valve; and
31—base, 32—load cell, 33—movable platform, 34—support frame, 35—support rod, 36—lever, 37—hanging chain, 38—weight, and 39—liquid discharge valve.

DETAILED DESCRIPTION OF THE EMBODIMENTS

In the following, the technical solution of the present disclosure will be described clearly and completely in combination with embodiments and accompanying drawings of the present disclosure. Obviously, the described embodiments do not limit the present disclosure.

Figure 1:
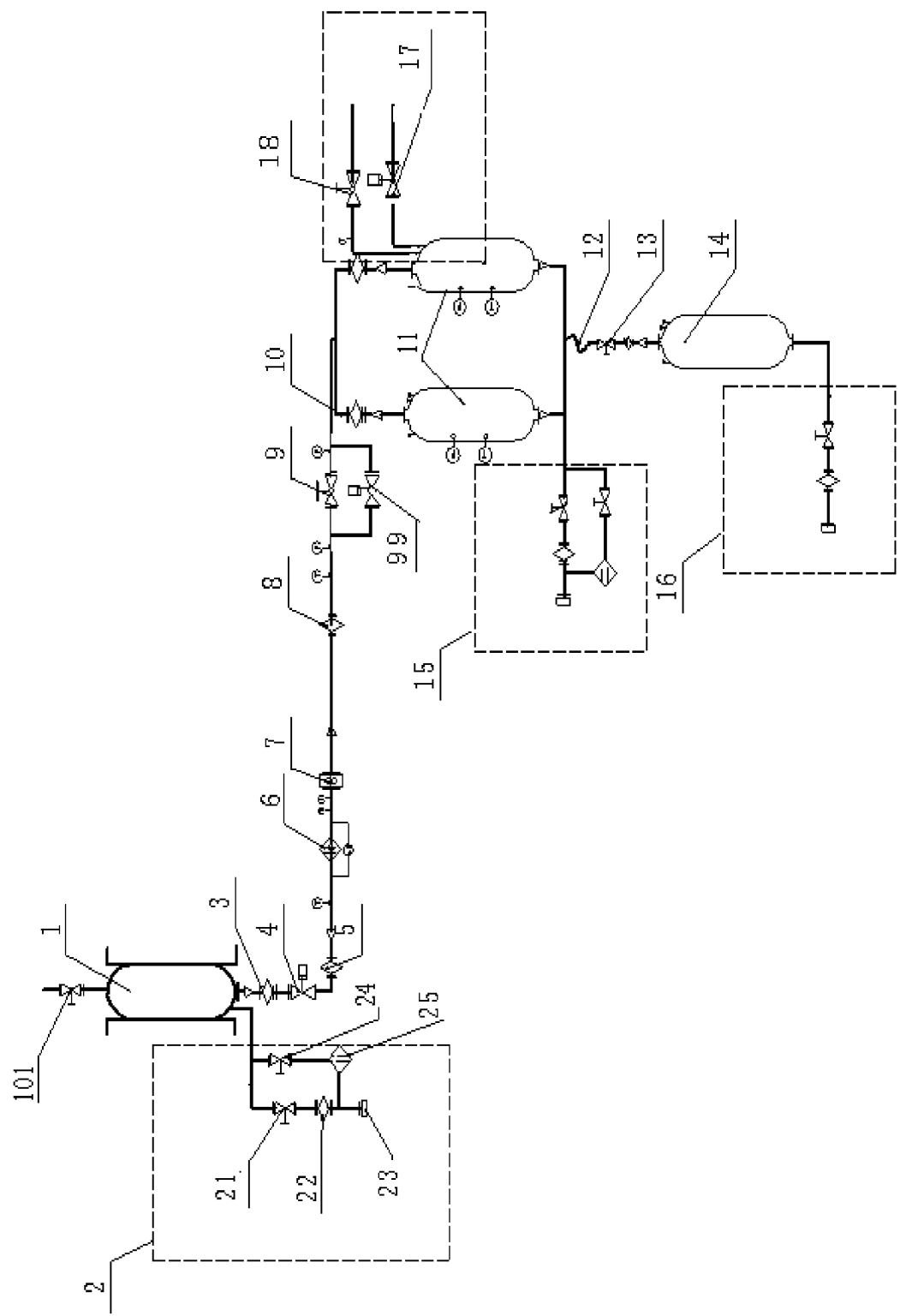
FIG. 1 is a schematic structural diagram of a flowmeter calibration system for a cryogenic propellant rocket engine in the present disclosure.
Figure 2:
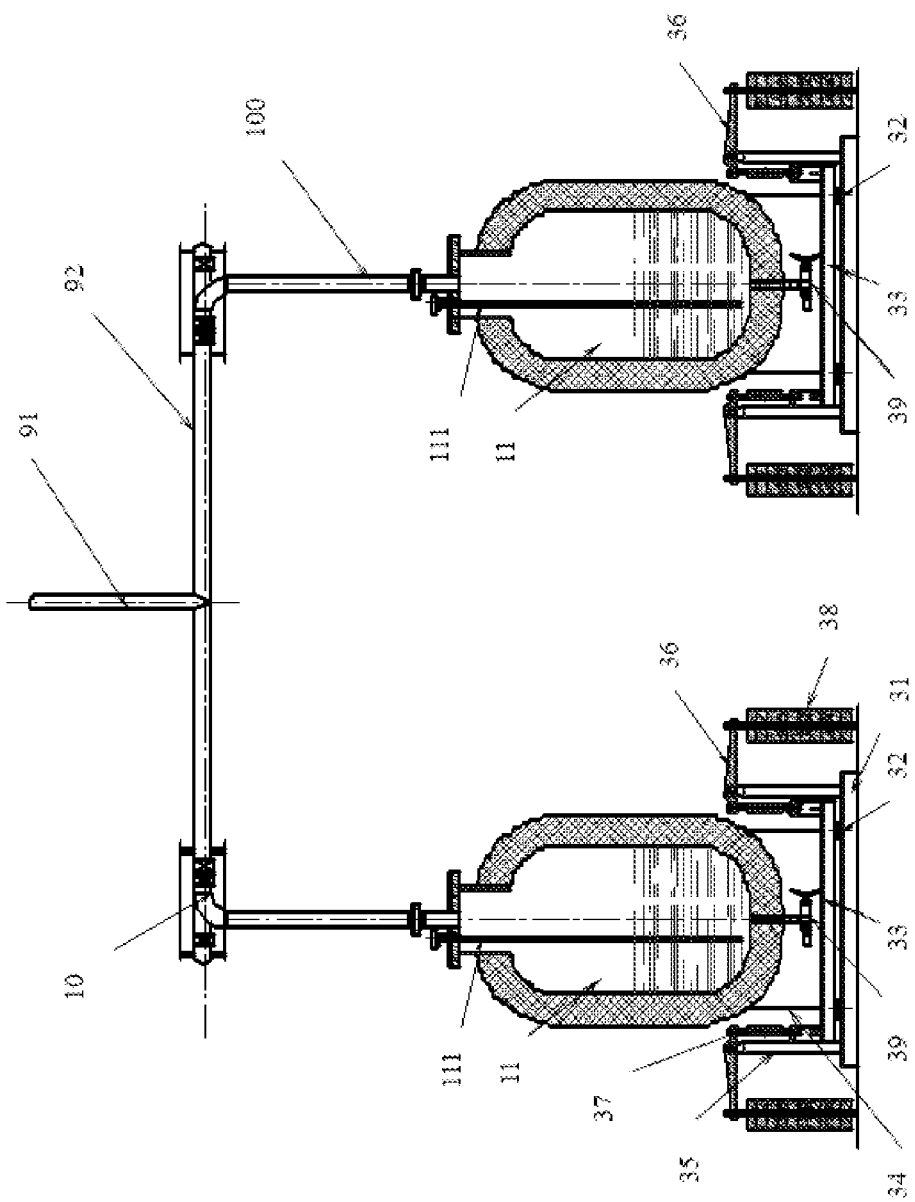
FIG. 2 is a schematic structural diagram of a weighing unit in a flowmeter calibration system for a cryogenic propellant rocket engine in the present disclosure.

As shown in FIG. 1 and FIG. 2, a flowmeter calibration system for a cryogenic propellant rocket engine in the embodiment includes a container filling unit 2, a container 1, a supply pipeline, a weighing unit, a quick recovery container 14, a recovery unit 16 and a weighing and filling recovery unit 15 which are sequentially connected;

the container filling unit 2 is configured to connect a tank wagon with the container 1; the supply pipeline includes at least one temperature sensor and at least one pressure sensor which are disposed at any position, as well as a container bottom corrugated compensator 3, a first isolation valve 4, a container horizontal-section corrugated compensator 5, a filter 6, a reference flowmeter 7, a middle corrugated compensator 8, a calibration flow adjusting manual valve 9, a vertical main pipe 91 and four circumferentially and uniformly distributed horizontal pipes 92 which are sequentially connected by a pipeline; and an inlet of the first isolation valve 4 is connected with an outlet of the container 1, an outlet of the vertical main pipe 91 is connected with inlets of the four horizontal pipes 92 respectively, and correspondingly, the four horizontal pipes are distributed in a cross pattern.

As shown in FIG. 2, the weighing unit includes four vertical branch pipes 100, four collection containers 11 and four weighing devices; the four vertical branch pipes communicate with corresponding horizontal pipes 92 respectively through a force balance compensator 10; the four vertical branch pipes are disposed right above the corresponding collection containers 11 respectively; the weighing devices are disposed below the 4 collection containers 11 correspondingly, and the weighing devices are configured to weight incremental liquids in the collection containers 11; and outlets of the collection containers 11 communicate with an inlet of the quick recovery container 14 through an isolation pipeline 12 and a second isolation valve 13, a liquid discharge valve 39 is disposed at the outlets of the collection containers 11, and by manually controlling opening and closing of the liquid discharge valve 39, the cryogenic mediums in the collection containers 11 are discharged to the weighing and filling recovery unit 15 or the recovery unit 16.

The weighing and filling recovery unit 15 is configured to connect the tank wagon with the collection containers 11; and the recovery unit is configured to connect the quick recovery container 14 with the tank wagon.

The weighing devices include weighing assemblies and two balance assemblies uniformly distributed on the weighing assemblies;

each weighing assembly includes a base 31, two load cells 32, a movable platform 33 and a support frame 34 which are sequentially disposed from bottom to top; the two load cells 32 are uniformly laid below a lower table surface of the movable platform 33, sensitive surfaces of the load cells 32 are in gap or contact arrangement with the lower table surface of the movable platform 33, and the support frame 34 is installed in a middle part of the movable platform 33 and configured to support the corresponding collection containers 11;

the two balance assemblies are symmetrically disposed on two sides of the movable platform 33, each balance assembly includes a support rod 35 disposed on the base 31, a lever 36 hinged on the support rod 35, a hanging chain 37 and a weight 38; and an inner side end of the lever 36 is connected with the movable platform 33 through the hanging chain 37, and the weight 38 is hung on an outer side end thereof.

Since the weight of the container 1 is large, if the load cells 32 are directly used to measure the weight, since the range of the load cells 32 is large, taking a 50 m³ container as an example, about four 100 kN or more are required, and the relative error is also relatively large. Therefore, four lever type force balancing devices are disposed around the platform. By disposing appropriate weights 38, the container can be lifted. With the increase of valves, the weight of the container on the load cells 32 gradually decreases. In an ideal state, the weight of the container on the load cells 32 may be 0. In actual use, it is generally controlled within 100 kg. At this time, the load cells may be replaced with load cells with a small range, such as four 5 kN-level sensors. Through the structure, high-precision weighing of the cryogenic mediums entering the container can be realized.

The container filling unit 2 includes a filling pipeline and a recovery pipeline connected to the filling pipeline in parallel, the filling pipeline is sequentially provided with a filling manual valve 25 and a filling filter 24 in a filling direction of the cryogenic medium, the recovery pipeline is sequentially provided with a recovery valve 21, a corrugated pipe compensator 22 and a filling interface 23 in a recovery direction of the cryogenic medium, the filling interface 23 is connected with the tank wagon through a hose, and the tank wagon is disposed near the container filling unit 2. A cryogenic medium outlet of the filling pipeline communicates with a bottom inlet of the container 1, a bottom outlet of the container 1 communicates with inlets of the collection containers 11 through the supply pipeline, outlets of the collection containers 11 communicate with the quick recovery container 14 through the isolation pipeline 12, the isolation pipeline 12 adopts a force isolation hose, and the second isolation valve 13 is disposed on the force isolation hose.

The weighing and filling recovery unit 15 has a same structure as the container filling unit 2, the weighing and filling recovery unit 15 is configured to fill the collection containers 11 with the cryogenic medium and recover the cryogenic medium therefrom, and the recovery unit 16 has a same structure with the recovery pipeline and is configured to recover the cryogenic mediums into the tank wagon.

In the embodiment, the force balance compensator 10 adopts an angle-type force balance compensator, the load cells are installed on a pull rod of the angle-type force balance compensator, and the collection containers 11 are fully enclosed vacuum sandwich containers; and the quick recovery container 14 is placed at a lower position and can be buried underground.

In order to realize the long-term and high safety discharge of the cryogenic mediums after the completion of the in-situ calibration of the container, the present disclosure can also add a set of exhaust system on each collection container 11, including a first exhaust pipeline and a second exhaust pipeline. Inlets of the first exhaust pipeline and the second exhaust pipeline both communicate with one of the collection containers 11, and outlets thereof are connected with an external gas purification system respectively; and the first exhaust pipeline includes an automatic exhaust valve 17, and the second exhaust pipeline includes a manual exhaust valve 18. Before calibrating the reference flowmeter, the explosive and flammable gas at the outlets of the collection containers 11 can be exhausted by controlling the opening of the automatic exhaust valve 17. After the calibration of the reference flowmeter is completed, the manual exhaust valve 18 can be opened to exhaust the excess explosive and flammable gas in the collection containers 11.

In the present disclosure, an exhaust system may further be installed on one of the collection containers 11, since the four collection containers 11 communicate with one another through the vertical main pipe 91, the flammable gas in all collection containers 11 may be exhausted.

At the same time, the calibration flow adjusting manual valve 9 is connected in parallel with a calibration pneumatic valve 99, when calibrating the reference flowmeter, the calibration pneumatic valve is controlled by the external control unit to quantitatively discharge a cryogenic medium in the supply pipeline to the weighing and filling recovery unit, so that the volume of the cryogenic medium decreasing in the same time period may be recorded many times.

The present disclosure further provides a flowmeter calibration method for the cryogenic propellant rocket engine, including the following steps:

step 1: in-situ calibration of a weighing unit step 1.1: cryogenic mediums are filled to collection containers 11 by a weighing and filling recovery unit 15, and when a filling liquid level 111 in each collection container 11 reaches 70% or above and temperatures of the cryogenic mediums in the collection containers 11 are <5° C., the cryogenic mediums in the collection containers 11 are recovered to a quick recovery container 14;

step 1.2: a zero position of a load cell 32 and a total mass $m_{total}$ of weights 38 on a weighing device are recorded;

step 1.3: according to a usable range of the load cell, weights with a preset mass $m_0$ are unloaded on each lever 36, an output value V of the load cell 32 and the mass m of the remaining weights are recorded, on this basis, the weights with the preset mass $m_0$ are unloaded again, the output value V of the load cell 32 and the mass m of the remaining weights are recorded, and in this way, the weights with the mass $m_0$ are unloaded for 5 times, and 5 groups of data are recorded totally;

the above preset mass $m_0$ refers to the range of the load cell. Generally, the following corresponding relationship exists: $m_0 = F/Mg$, wherein F is a maximum range of the load cell, and g is an acceleration of gravity; and step 1.4: step 1.3 is repeated twice to obtain 15 groups of data totally, and least squares fit is performed on the recorded 15 groups of data to obtain a corresponding relationship between V and ($m_{total}$ − m), so as to complete the in-situ calibration of the weighing unit.

Step 2: precooling of a cryogenic medium in-situ calibration system step 2.1: the cryogenic mediums are filled to the collection containers 11 by the weighing and filling recovery unit 15, and a filling liquid level in each collection container 11 reaches 40% or above. At the same time, the cryogenic mediums are filled to the container 1 by a container filling unit 2, a cryogenic medium tank wagon transports the cryogenic mediums into the container 1 from a filling filter 24 and a filling manual valve 25 sequentially through pressurization. In a filling process, it is necessary to ensure that a top exhaust valve 101 of the container 1 is in an open state, so as to ensure that vaporized gas may be exhausted in time after the cryogenic mediums enter the container 1, the interior of the container 1 cannot generate excessive pressure, so that the filling liquid level of the container 1 reaches 70% or above, and the precooling of the collection containers 11 and the container 1 is realized;

step 2.2: when the temperatures of the cryogenic mediums in the collection containers 11 and the container 1 are <5° C., the first isolation valve 4 is opened, the calibration flow adjusting manual valve 9 is closed, the first pipeline in front of the supply pipeline manual valve 9 is cooled by the cryogenic mediums, and meanwhile the second isolation valve 13 is opened to discharge the cryogenic mediums in the collection containers 11;

step 2.3: when a difference between a measured temperature of a temperature sensor in the first pipeline and temperatures of the cryogenic mediums under a standard atmospheric pressure is less than 5° C. (taking liquid oxygen as an example, the temperature thereof under the standard atmospheric pressure is −183° C., and the measured temperature of the relevant pipeline is required to be lower than −178° C.), at this time, after the first pipeline is completely cooled, the container 1 has no serious exhaust phenomenon. The calibration flow adjusting manual valve 9 is opened, the second pipeline and the vertical branch pipes behind the supply pipeline manual valve 9 are cooled, and flow adjustment is performed according to the cold state of the second pipeline and the vertical branch pipes 100 of the supply pipeline;

step 2.4: when a difference between a measured temperature of a temperature sensor in the second pipeline and the temperatures of the cryogenic mediums under the standard atmospheric pressure is less than 5° C. and the pressure of the cryogenic mediums in the supply pipeline is ≤0.05 Mpa, the calibration flow adjusting manual valve 9 is closed, and the second isolation valve 13 is opened, so as to realize the precooling of the cryogenic medium in-situ calibration system after draining the cryogenic mediums from the collection containers 11, the isolation pipeline 12 and the quick recovery container 14.

Step 3: in-situ calibration of a container step 3.1: the calibration flow adjusting manual valve 9 and the second isolation valve 13 are closed, the first isolation valve 4 is opened, and the container 1 is filled by a container filling unit 2 to a highest liquid level required to be calibrated; and step 3.2: the calibration flow adjusting manual valve 9 is gradually opened according to a liquid level drop height required to be calibrated for the container 1, the cryogenic mediums in the container 1 are slowly discharged to the collection containers 11 (slow discharging may ensure that the cryogenic mediums are discharged according to the predetermined amount each time, and it is better to complete the discharge once every 10 min), each collection container 11 is weighed by using the weighing device, the volume corresponding to each liquid level drop height in the container 1 is calculated, and repeating is performed for at least one time to complete calibration of the container 1; and for example, when the liquid oxygen in the container 1 drops by a certain height, such as 10 cm, the cryogenic mediums entering the collection containers 11 are weighed, for example, the weight is 114 kg after weighing.

After weighing is completed each time, the second isolation valve 13 is opened to discharge the weighed cryogenic mediums from the collection containers 11, which may be discharged to the quick recovery container 14, and if the liquid level in the quick recovery container 14 is too high, the recovery unit 16 may be used to discharge it.

Since a plurality of previous precooling steps are performed by the system, the system is already at the basically same temperature as the cryogenic mediums, the evaporation capacity is very small, which is basically consistent with the water calibration. According to the situation that the weight of the mediums whose liquid level drops by 10 cm is 114 kg, the volume of this section of the collection container 11 is 0.1 m$^3$. After weighing is completed each time, the second isolation valve 13 is used to discharge the weighed cryogenic mediums to the quick recovery container 14. If the liquid level in the quick recovery container 14 is too high, the recovery unit 16 may be used to discharge it.

Through the above steps, the corresponding volume of each equal height segment (for example, the height segment with a unit of 10 cm) in the container 1 may be obtained, thus completing the in-situ calibration of the container 1.

Step 4: calibration of a reference flowmeter step 4.1: the second isolation valve 13 is closed, or an isolation pipeline 12 and a downstream pipeline thereof are removed, so as to discharge the cryogenic mediums in the collection containers 11 only from the weighing and filling recovery unit 15;

the first isolation valve 4 and the calibration flow adjusting manual valve 9 are closed, and the container is filled by the container filling unit 2 to a highest liquid level required to be calibrated;

step 4.11: a cryogenic medium exhaust system is connected to the collection containers 11, an automatic exhaust valve 17 is opened through an external control unit, gas generated by volatilization of the cryogenic mediums in the system is exhausted, and the automatic exhaust valve 17 is closed when the pressure in the system is ≤0.1 MPa; and step 4.2: the first isolation valve 4 and a calibration pneumatic valve 99 are opened, the cryogenic mediums are discharged from the weighing and filling recovery unit 15 after passing through the supply pipeline and the collection containers 11 sequentially, the volume of the cryogenic mediums decreasing in the container 1 in the same time period is recorded many times, an average flow rate of the supply pipeline in this time period is calculated, and a flow rate of the reference flowmeter 7 is calibrated by the average flow rate.

During calibration, the cryogenic mediums are discharged for a period of time according to expected time, and then the measured data is used to calculate and complete the calibration. For example, the number of turns of the flowmeter that drops 20 cm from the liquid level of 5-15 s in the discharge process is 100. According to the previous calibration results, the containers calibrated at 20 cm are 0.1 m$^3$ and 0.11 m$^3$ respectively. Therefore, the discharge container for 5-15 s is 0.21 m$^3$, and the volume of each turn of the flowmeter is 0.0021 m$^3$.

In this embodiment, by using the cryogenic medium exhaust system, the gas generated by the volatilization of the cryogenic mediums in the system can be discharged before the calibration of the reference flowmeter. The cryogenic medium containing gas is safe and reliable with small emissions. The discharge calibration of the cryogenic mediums for a long time can be realized, and the calibration algorithm for the average flow can greatly improve the calibration accuracy.

The described above are only embodiments of the present disclosure, not a limitation on the scope of protection of the present disclosure. Any equivalent structural transformation made by using the contents of the description and the accompanying drawings of the present disclosure, or direct or indirect application in other related technical fields, is included in the scope of patent protection of the present disclosure.

What is claimed is:

1. A flowmeter calibration system for a cryogenic propellant rocket engine,
comprising a container filling unit (2), a container (1), a supply pipeline, a weighing unit, a quick recovery container (14), a recovery unit (16) and a weighing and filling recovery unit (15) that are sequentially connected; wherein:
the container filling unit (2) is configured to connect a tank wagon with the container (1);
the supply pipeline comprises at least one temperature sensor and at least one pressure sensor which are disposed at any position, as well as a first isolation valve (4), a reference flowmeter (7), a calibration flow adjusting manual valve (9), a vertical main pipe (91) and N circumferentially and uniformly distributed horizontal pipes (92) which are sequentially connected by a pipeline, wherein 2≤N≤6; an inlet of the first isolation valve (4) is connected with an outlet of the container (1), and an outlet of the vertical main pipe (91) is connected with inlets of the N horizontal pipes (92) respectively;
the weighing unit comprises several vertical branch pipes (100), several collection containers (11) and several weighing devices; vertical branch pipes communicate with corresponding horizontal pipes (92) respectively through a force balance compensator (10); vertical branch pipes are disposed right above the corresponding collection containers (11) respectively; the weighing devices are disposed below collection containers (11) correspondingly, and the weighing devices are configured to weight incremental liquids in the collection containers (11);
outlets of the collection containers (11) communicate with an inlet of the quick recovery container (14) through an isolation pipeline (12) and a second isolation valve (13);
the weighing and filling recovery unit (15) is configured to connect the tank wagon with the collection containers (11);
the recovery unit is configured to connect the quick recovery container (14) with the tank wagon;
the weighing devices comprise weighing assemblies and at least two balance assemblies uniformly distributed on the weighing assemblies;
each weighing assembly comprises a base (31), at least two load cells (32), a movable platform (33) and a support frame (34) which are sequentially disposed from bottom to top; the at least two load cells (32) are uniformly laid below a lower table surface of the movable platform (33), sensitive surfaces of the load cells (32) are in gap or contact arrangement with the lower table surface of the movable platform (33), and the support frame (34) is installed in a middle part of the movable platform (33) and configured to support the corresponding collection container (11);
each balance assembly comprises a support rod (35) disposed on the base (31), a lever (36) hinged on the support rod (35), a hanging chain (37) and a weight (38); and
an inner side end of the lever (36) is connected with the movable platform (33) through the hanging chain (37), and the weight (38) is hung on an outer side end thereof.

2. The flowmeter calibration system for the cryogenic propellant rocket engine according to claim 1, wherein
two balance assemblies are symmetrically disposed on two sides of the movable platform (33).

3. The flowmeter calibration system for the cryogenic propellant rocket engine according to claim 1, wherein
four collection containers (11) are disposed, and the corresponding four horizontal pipes (92) are distributed in a cross pattern.

4. The flowmeter calibration system for the cryogenic propellant rocket engine according to claim 3, wherein:
the flowmeter calibration system further comprises a cryogenic medium exhaust system, the cryogenic medium exhaust system comprises at least two exhaust pipelines, inlets of the exhaust pipelines communicate with at least one collection container (11) respectively, and outlets thereof are connected with an external gas purification system respectively; one of the exhaust pipelines is provided with an automatic exhaust valve (17), the automatic exhaust valve (17) is controlled by an external control unit to exhaust gas in the collection containers (11), and other exhaust pipelines are provided with manual exhaust valves (18); and
the calibration flow adjusting manual valve (9) is connected in parallel with a calibration pneumatic valve (99), and the calibration pneumatic valve (99) is controlled by the external control unit to discharge a cryogenic medium in the supply pipeline to the weighing and filling recovery unit (15).

5. The flowmeter calibration system for the cryogenic propellant rocket engine according to claim 4, wherein:
the container filling unit (2) comprises a filling pipeline and a recovery pipeline connected to the filling pipeline, the filling pipeline is sequentially provided with a filling manual valve (25) and a filling filter (24) in a filling direction of the cryogenic medium, the recovery pipeline is sequentially provided with a recovery valve (21), a corrugated pipe compensator (22) and a filling interface (23) in a recovery direction of the cryogenic medium, and the filling interface (23) is connected with the tank wagon through a flexible pipe; and
the weighing and filling recovery unit (15) has a same structure as the container filling unit (2), the weighing and filling recovery unit (15) is configured to fill the collection containers (11) with the cryogenic medium and recover the cryogenic medium therefrom, and the recovery unit (16) has a same structure with the recovery pipeline and is configured to recover the cryogenic medium into the tank wagon.

6. The flowmeter calibration system for the cryogenic propellant rocket engine according to claim 5, wherein
the force balance compensator (10) adopts an angle-type force balance compensator, and the load cells are installed on a pull rod of the angle-type force balance compensator.

7. The flowmeter calibration system for the cryogenic propellant rocket engine according to claim 6, wherein:
the supply pipeline is further provided with a container bottom corrugated compensator (3), a container horizontal-section corrugated compensator (5), a filter (6) and a middle corrugated compensator (8) in a transportation direction of the cryogenic medium; and the collection containers (11) are fully enclosed vacuum sandwich containers.

8. A flowmeter calibration method for a cryogenic propellant rocket engine, comprising the following steps:

step 1: in-situ calibration of a weighing unit step 1.1: filling, by a weighing and filling recovery unit (15), collection containers (11) with cryogenic mediums, and recovering, when a filling liquid level in each collection container (11) reaches 70% or above and temperatures of the cryogenic mediums in the collection containers (11) are <5° C., the cryogenic mediums in the collection containers (11) to a quick recovery container (14);

step 1.2: recording a zero position of a load cell (32) and a total mass $m_{total}$ of weights (38) on a weighing device;

step 1.3: unloading, according to a usable range of the load cell (32), weights with a preset mass $m_0$ on each lever (36), recording an output value V of the load cell (32) and the mass m of the remaining weights, on this basis, unloading the weights with the preset mass $m_0$ again, recording the output value V of the load cell (32) and the mass m of the remaining weights, and in this way, unloading the weights with the mass $m_0$ for M times, and recording M groups of data totally, wherein M≥5, $m_0$=F/Mg, F is a maximum range of the load cell, and g is an acceleration of gravity; and step 1.4: repeating step 1.3 for K times, wherein K≥2, and performing least squares fit on recorded ((K+1)×M) groups of data to obtain a corresponding relationship between V and ($m_{total}$–m), so as to complete the in-situ calibration of the weighing unit;

step 2: precooling of a cryogenic medium in-situ calibration system precooling the collection containers (11) and a first pipeline in front of a container (1) and a supply pipeline manual valve sequentially and cooling a second pipeline and vertical branch pipes (100) behind the supply pipeline manual valve (9) by the cryogenic mediums; requiring that a difference between a temperature of a previous precooling area and temperatures of the cryogenic mediums under a standard atmospheric pressure is less than 5° C. before the precooling of a next precooling area;

closing a calibration flow adjusting manual valve (9) after cooling of the second pipeline and the vertical branch pipes (100) is completed, and draining a pipeline system at a down stream of the calibration flow adjusting manual valve (9), so as to realize the precooling of the cryogenic medium in-situ calibration system;

step 3: in-situ calibration of a container step 3.1: closing a second isolation valve (13), opening a first isolation valve (4), and filling the container (1) by a container filling unit (2);

step 3.2: gradually opening the calibration flow adjusting manual valve (9) according to a liquid level drop height required to be calibrated for the container (1), slowly discharging the cryogenic mediums in the container (1) to the collection containers (11), weighing each collection container (11) by using the weighing device, calculating a volume corresponding to each liquid level drop height in the container (1), and repeating for at least one time to complete calibration of the container (1); and opening, after weighing is completed each time, the second isolation valve (13) to discharge the weighed cryogenic mediums from the collection containers (11); and step 4: calibration of a reference flowmeter step 4.1: closing the second isolation valve (13), or removing an isolation pipeline (12) and a downstream pipeline thereof;

closing the first isolation valve (4) and the calibration flow adjusting manual valve (9), and filling the container (1) by the container filling unit (2); and step 4.2: opening the first isolation valve (4) and a calibration pneumatic valve (99), discharging the cryogenic mediums from the weighing and filling recovery unit (15) after passing through the supply pipeline and the collection containers (11), recording the volume of the cryogenic mediums decreasing in the container (1) in the same time period many times, calculating an average flow rate of the supply pipeline in this time period, and calibrating a flow rate of the reference flowmeter (7) by the average flow rate.

9. The flowmeter calibration method for the cryogenic propellant rocket engine according to claim 8, wherein between step 4.1 and step 4.2, the flowmeter calibration method further comprises step 4.11: connecting a cryogenic medium exhaust system to the collection containers (11), opening an automatic exhaust valve (17) through an external control unit, and exhausting gas generated by volatilization of the cryogenic mediums in the system; and closing the automatic exhaust valve (17) when the pressure in the system is ≤0.1 MPa.

10. The flowmeter calibration method for the cryogenic propellant rocket engine according to claim 8, wherein the precooling of the cryogenic medium in-situ calibration system in step 2 is specifically as follows:

step 2.1: filling, by the weighing and filling recovery unit (15), the collection containers (11) with the cryogenic mediums, and meanwhile, filling, by the container filling unit (2), the container (1) with the cryogenic mediums, wherein when the filling liquid levels in the collection containers (11) all reach 40% or above, and the filling liquid level of the container (1) reaches 70% or above, the precooling of the collection containers (11) and the container (1) is realized;

step 2.2: opening, when the temperatures of the cryogenic mediums in the collection containers (11) and the container (1) are all <5° C., the first isolation valve (4), closing the calibration flow adjusting manual valve (9), cooling the first pipeline in front of the supply pipeline manual valve (9) by the cryogenic mediums, and meanwhile opening the second isolation valve (13) to discharge the cryogenic mediums in the collection containers (11);

step 2.3: opening, when a difference between a measured temperature of a temperature sensor in the first pipeline and the temperatures of the cryogenic mediums under the standard atmospheric pressure is less than 5° C., the calibration flow adjusting manual valve (9), and cooling the second pipeline and the vertical branch pipes (100) behind the supply pipeline manual valve (9); and step 2.4: closing, when a difference between a measured temperature of a temperature sensor in the second pipeline and the temperatures of the cryogenic mediums under the standard atmospheric pressure is less than 5° C. and the pressure of the cryogenic mediums in the supply pipeline is ≤0.05 Mpa, the calibration flow adjusting manual valve (9), and opening the second isolation valve (13), so as to realize the precooling of the cryogenic medium in-situ calibration system after draining the cryogenic mediums from the collection containers (11), the isolation pipeline (12) and the quick recovery container (14).

\* \* \* \* \*